United States Patent
Leung et al.

(10) Patent No.: US 8,195,778 B1
(45) Date of Patent: Jun. 5, 2012

(54) SYSTEM AND METHOD FOR PROVIDING MOBILITY ACROSS ACCESS TECHNOLOGIES IN A NETWORK ENVIRONMENT

(75) Inventors: Kent K. Leung, Los Altos, CA (US); Biswaranjan Panda, Santa Clara, CA (US); Naveen Paulkandasamy, San Jose, CA (US); Michael Shannon, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 138 days.

(21) Appl. No.: 12/642,797

(22) Filed: Dec. 19, 2009

(51) Int. Cl.
G06F 15/177 (2006.01)
(52) U.S. Cl. ........ 709/222; 709/223; 709/224; 709/227; 709/230
(58) Field of Classification Search .................. 709/222, 709/223, 224, 227, 230
See application file for complete search history.

(56) References Cited

U.S. PATENT DOCUMENTS

| | | | |
|---|---|---|---|
| 6,304,567 B1 | 10/2001 | Rosenberg | |
| 6,910,074 B1 | 6/2005 | Amin et al. | |
| 6,937,597 B1 | 8/2005 | Rosenberg et al. | |
| 6,970,909 B2 | 11/2005 | Schulzrinne | |
| 7,020,090 B2 | 3/2006 | Chandwadkar et al. | |
| 7,079,499 B1 | 7/2006 | Akhtar et al. | |
| 7,170,863 B1 | 1/2007 | Denman et al. | |
| 7,170,887 B2 | 1/2007 | Rosenberg | |
| 7,548,756 B2 | 6/2009 | Velthuis et al. | |
| 7,606,191 B1 | 10/2009 | Breau et al. | |
| 7,710,923 B2 | 5/2010 | Carlton | |
| 7,831,701 B2 | 11/2010 | Hu | |
| 7,835,275 B1 | 11/2010 | Swan et al. | |
| 7,886,027 B2 | 2/2011 | Bolan et al. | |
| 7,899,039 B2 | 3/2011 | Andreasen et al. | |
| 2003/0165145 A1* | 9/2003 | Cho | 370/401 |
| 2004/0003241 A1 | 1/2004 | Sengodan et al. | |
| 2004/0057458 A1* | 3/2004 | Kil et al. | 370/466 |
| 2004/0219905 A1 | 11/2004 | Blumenthal et al. | |
| 2005/0135375 A1 | 6/2005 | Hurtta et al. | |
| 2005/0238002 A1 | 10/2005 | Rasanen | |
| 2005/0278532 A1 | 12/2005 | Fu et al. | |
| 2006/0250956 A1 | 11/2006 | Alfano et al. | |
| 2006/0251043 A1 | 11/2006 | Madour et al. | |

(Continued)

OTHER PUBLICATIONS

U.S. Appl. No. 12/771,574, filed Apr. 30, 2010, entitled "System and Method for Providing Selective Bearer Security in a Network Environment," Inventor(s): Flemming S. Andreasen.

(Continued)

Primary Examiner — Lan-Dai Truong
(74) Attorney, Agent, or Firm — Patent Capital Group

(57) ABSTRACT

An example method includes receiving a packet for a flow associated with a subscriber; determining if a home agent element has a context for the flow by communicating a handover query to a network element; assigning an Internet protocol (IP) address for the subscriber in response to the home agent element not having the context for the flow; and creating a session for the subscriber, where the session is created using inter-process communication between the home agent element and the network element. The method can further include maintaining communications with a packet data serving node (PDSN) and an Authentication, Authorization, and Accounting (AAA) element in order to assist in roaming between a Long Term Evolution (LTE) network and a code division multiple access (CDMA) network. The inter-process communication is used to maintain the session for the subscriber when the subscriber is attached to different networks.

20 Claims, 14 Drawing Sheets

U.S. PATENT DOCUMENTS

| | | |
|---|---|---|
| 2006/0251229 A1 | 11/2006 | Gorti et al. |
| 2006/0268845 A1 | 11/2006 | He et al. |
| 2007/0133574 A1 | 6/2007 | Tejani et al. |
| 2007/0140255 A1* | 6/2007 | Gautier et al. ............ 370/395.5 |
| 2007/0160034 A1 | 7/2007 | Koretsky |
| 2007/0189255 A1 | 8/2007 | Navali et al. |
| 2007/0202871 A1 | 8/2007 | Altshuller et al. |
| 2007/0207818 A1 | 9/2007 | Rosenberg et al. |
| 2008/0026692 A1 | 1/2008 | Kojima |
| 2008/0046963 A1 | 2/2008 | Grayson et al. |
| 2008/0046979 A1 | 2/2008 | Oulahal |
| 2008/0049648 A1 | 2/2008 | Liu et al. |
| 2008/0070619 A1 | 3/2008 | Yu |
| 2008/0089251 A1 | 4/2008 | Gallego et al. |
| 2008/0229403 A1 | 9/2008 | Oswal et al. |
| 2008/0256237 A1 | 10/2008 | Liu |
| 2008/0285492 A1 | 11/2008 | Vesterinen |
| 2008/0307487 A1 | 12/2008 | Choyi et al. |
| 2009/0067417 A1 | 3/2009 | Kalavade et al. |
| 2009/0198996 A1 | 8/2009 | Lie et al. |
| 2009/0207759 A1 | 8/2009 | Andreasen et al. |
| 2009/0207823 A1 | 8/2009 | Andreasen et al. |
| 2009/0207843 A1 | 8/2009 | Andreasen et al. |
| 2010/0131621 A1 | 5/2010 | Zetterlund et al. |
| 2010/0135279 A1 | 6/2010 | Petersson et al. |
| 2010/0191829 A1 | 7/2010 | Cagenius |
| 2010/0272053 A1 | 10/2010 | You et al. |
| 2011/0103266 A1 | 5/2011 | Andreasen et al. |

OTHER PUBLICATIONS

USPTO Apr. 8, 2011 Final Office Action from U.S. Appl. No. 12/371,516.

Vakil, Surnit: et al., "Diameter: IP Security Policy Extensions," Internet Draft draft-calhoun-diameter-ipsec-policy-00.txt, Mar. 1998, 35 pages; http://tools.ietf.org/pdf/draft-calhoun-diameter-ipsec-policy-00.pdf.

USPTO Jul. 8, 2011 RCE Response to Apr. 8, 2011 Final Office Action from U.S. Appl. No. 12/371,516.

USPTO Jun. 9, 2011 Final Office Action from U.S. Appl. No. 12/371,524.

USPTO Sep. 9, 2011 RCE Response to Jun. 9, 2011 Final Office Action from U.S. Appl. No. 12/371,524.

USPTO Jul. 21, 2011 Non-Final Office Action from U.S. Appl. No. 12/371,511.

USPTO Nov. 17, 2011 Final Office Action from U.S. Appl. No. 12/371,511.

USPTO Oct. 7, 2011 Non-Final Office Action from U.S. Appl. No. 12/642,797.

USPTO Oct. 19, 2011 Response to Non-Final Office Action mailed Jul. 21, 2011 from U.S. Appl. No. 12/371,511.

USPTO Mar. 14, 2012 Response to Non-Final Office Action mailed Dec. 14, 2011 from U.S. Appl. No. 12/371,524.

USPTO Dec. 14, 2011 Non-Final Office Action from U.S. Appl. No. 12/371,524.

USPTO Jan. 30, 2012 Request for Continued Examination in response to Nov. 17, 2011 Final Office Action from U.S. Appl. No. 12/371,511.

* cited by examiner

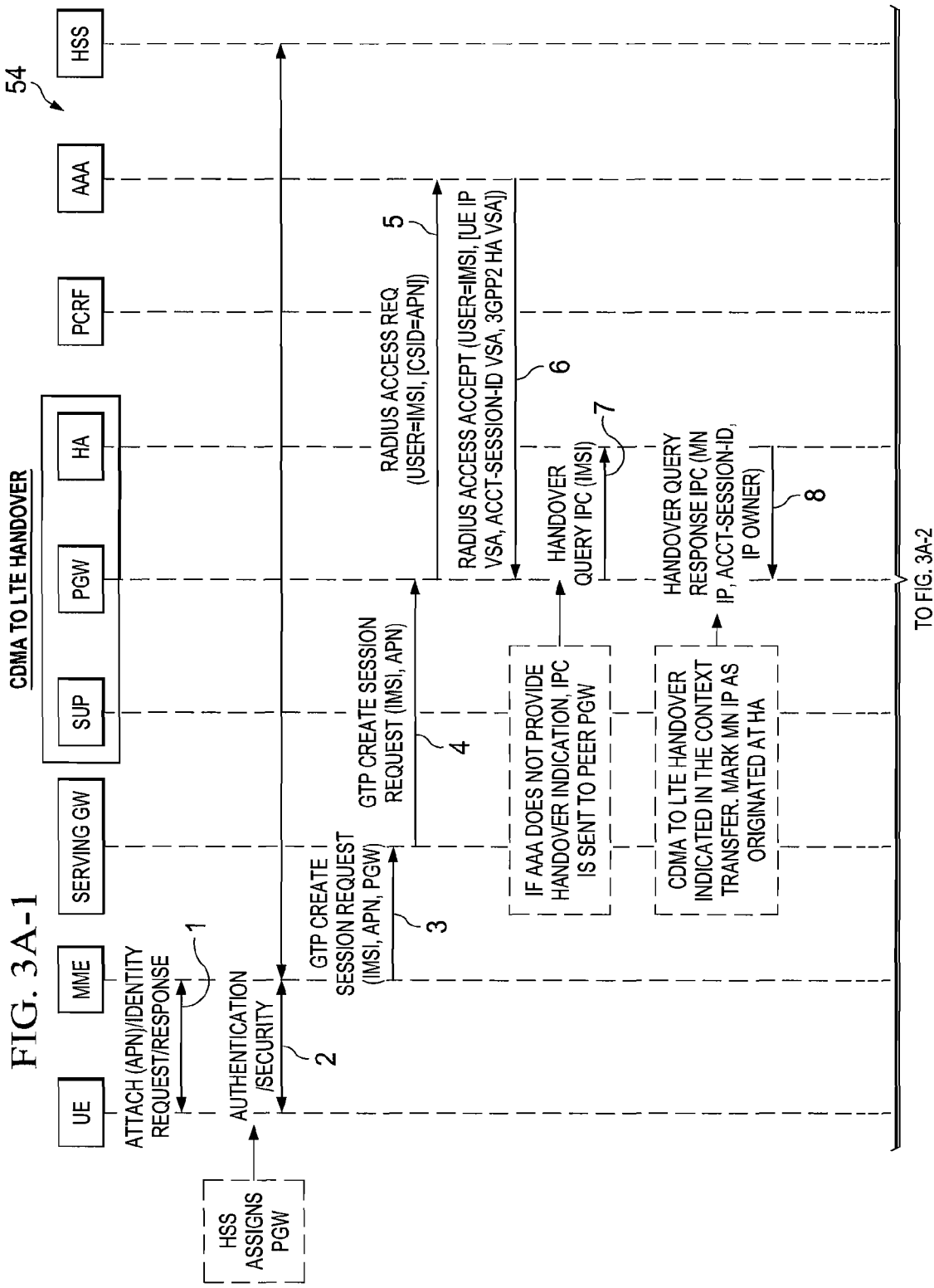

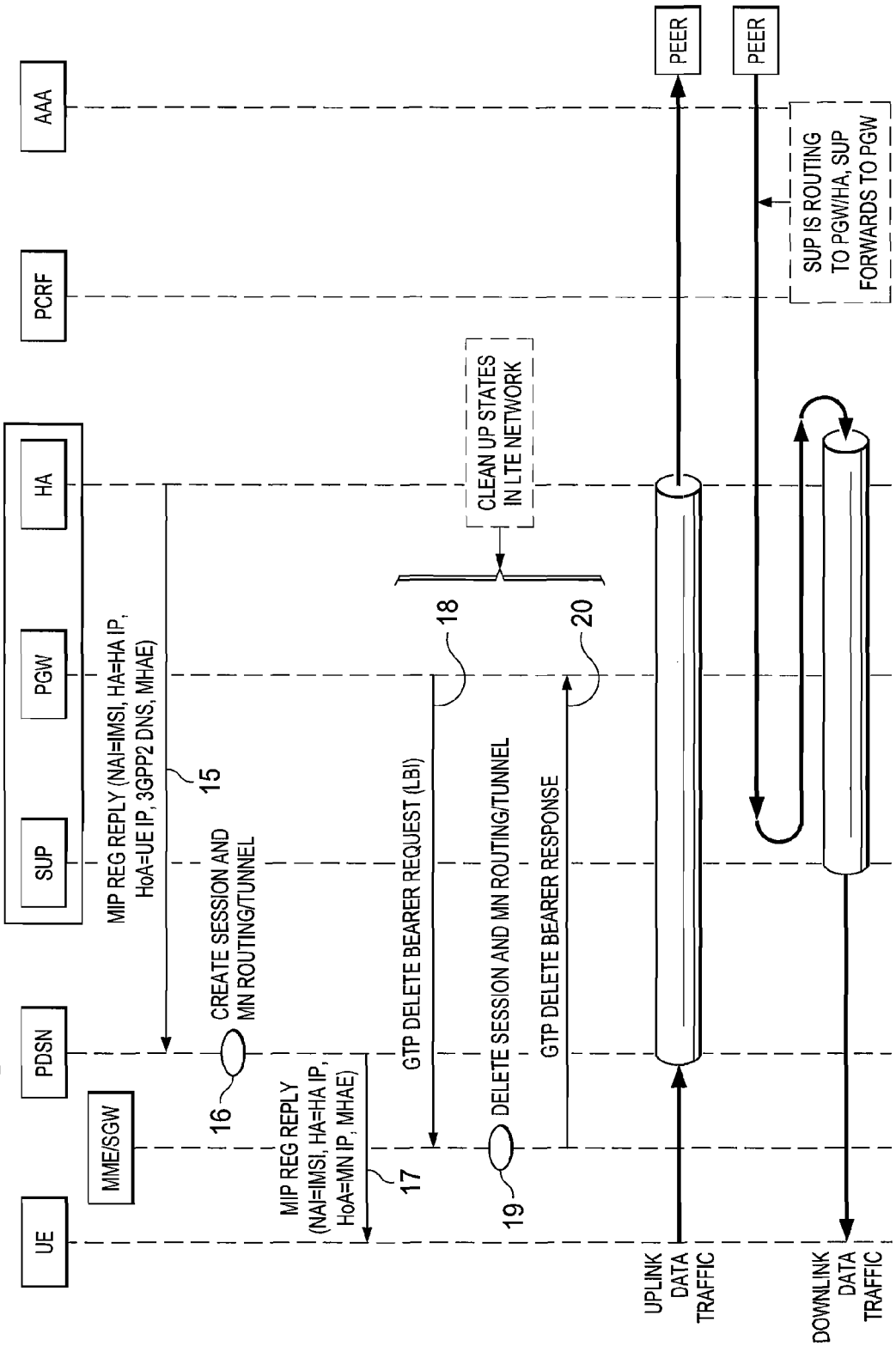

SYSTEM AND METHOD FOR PROVIDING MOBILITY ACROSS ACCESS TECHNOLOGIES IN A NETWORK ENVIRONMENT

TECHNICAL FIELD

This disclosure relates in general to the field of communications and, more particularly, to providing mobility across access technologies in a network environment.

BACKGROUND

Networking architectures have grown increasingly complex in communications environments. In addition, the augmentation of clients or end users wishing to communicate in a network environment has caused many networking configurations and systems to respond by adding elements to accommodate the increase in networking traffic. As the subscriber base of end users increases, proper routing and efficient management of communication sessions and data flows become even more critical. Long Term Evolution (LTE) represents the last step toward the 4th generation (4G) of radio technologies designed to increase the capacity and the speed of mobile networks. The current generation of mobile networks are collectively known as 3G (for "third generation"), whereas LTE is marketed as a 4G solution. Most major mobile carriers have announced plans to convert their existing networks to LTE networks. The LTE network offers a set of enhancements to the Universal Mobile Telecommunications System (UMTS) that is slated to be introduced in a 3rd Generation Partnership Project (3GPP) Release. As this transition occurs, there is a significant challenge in coordinating existing architectures and associated infrastructure.

BRIEF DESCRIPTION OF THE DRAWINGS

To provide a more complete understanding of the present disclosure and features and advantages thereof, reference is made to the following description, taken in conjunction with the accompanying figures, where like reference numerals represent like parts, in which:

FIGS. 2A-7 are simplified flow diagrams representing various example activities, which may be applicable to certain communication scenarios involving the communication system.

DETAILED DESCRIPTION OF EXAMPLE EMBODIMENTS OVERVIEW

A method is provided in one embodiment and includes receiving a packet for a flow associated with a subscriber; determining if a home agent element has a context for the flow by communicating a handover query to a network element; assigning an Internet protocol (IP) address for the subscriber in response to the home agent element not having the context for the flow; and creating a session for the subscriber, where the session is created using inter-process communication between the home agent element and the network element. The method can further include maintaining communications with a packet data serving node (PDSN) and an Authentication, Authorization, and Accounting (AAA) element in order to assist in roaming between a Long Term Evolution (LTE) network and a code division multiple access (CDMA) network. The inter-process communication is used to maintain the session for the subscriber when the subscriber is attached to different networks. An accounting interim message update can be sent and it can include an accounting session identification. In other embodiments, the method can include assigning the IP address for the subscriber and this can include evaluating whether a local IP address pool has an available IP address. Another gateway is contacted if the local IP address pool does not have an available IP address. The method can also include assigning new routing information associated with the IP address that was assigned for the subscriber such that data traffic is sent to the subscriber.

Example Embodiments

Figure 1:
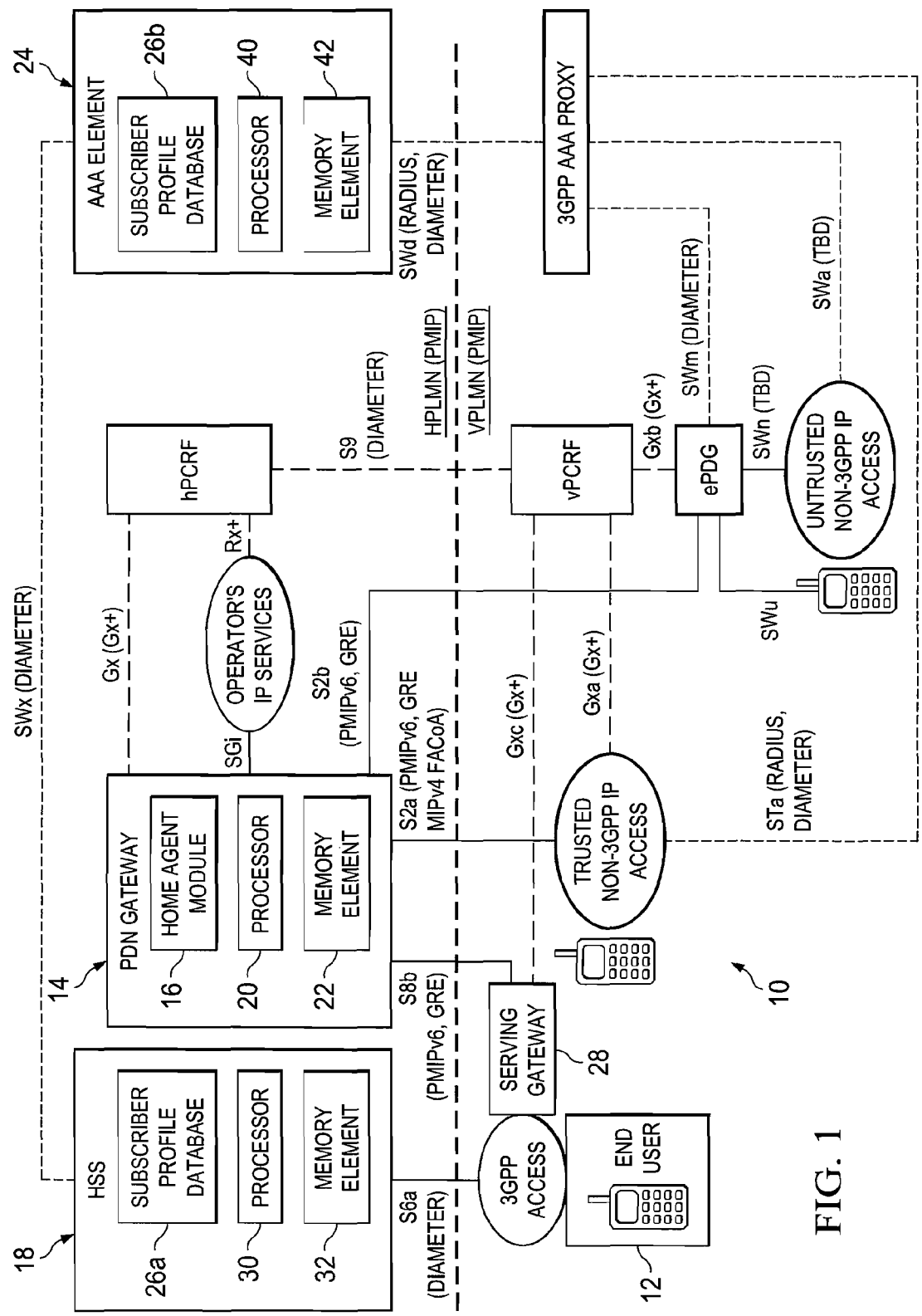
FIG. 1 is a simplified block diagram of a communication system for providing mobility across access technologies in a network environment in accordance with one embodiment of the present disclosure.

Turning to FIG. 1, FIG. 1 is a simplified block diagram of a communication system 10 for providing mobility across access technologies in a network environment. This particular configuration may be tied to the 3rd Generation Partnership Project (3GPP) Evolved Packet System architecture, but alternatively this depicted architecture may be applicable to other environments equally. The example architecture of FIG. 1 includes an end user 12 and a packet data network (PDN) gateway 14, which includes a home agent module 16, a processor 20, and a memory element 22. Also provided is a home subscriber server (HSS) 18 and an Authentication, Authorization, and Accounting (AAA) element 24, where each of these items include a subscriber profile database 26a-b, a processor 30, 40, and memory elements 32, 42 respectively. FIG. 1 also includes a serving gateway 28 that has a logical connection to end user 12 and PDN gateway 14. Note that many of the functions inherent in these devices are explained in detail below.

Each of the elements of FIG. 1 may couple to one another through simple interfaces (as illustrated) or through any other suitable connection (wired or wireless), which provides a viable pathway for network communications. Additionally, any one or more of these elements may be combined or removed from the architecture based on particular configuration needs. Communication system 10 may include a configuration capable of transmission control protocol/Internet protocol (TCP/IP) communications for the transmission or reception of packets in a network. Communication system 10 may also operate in conjunction with a user datagram protocol/IP (UDP/IP) or any other suitable protocol where appropriate and based on particular needs.

Note that before proceeding to operational aspects of communication system 10, it is important to identify some of the acronyms that may be used herein in this Specification. These include: User Equipment (UE), Policy and Charging Rules Function (PCRF) [for both the home and visited cases (hPCRF and vPCRF respectively), Profile Database Function (PDBF), Mobile Internet Protocol (MIP), Network Access Identifier (NAI), International Mobile Subscriber Identity (IMSI), Packet Gateway (PGW), Serving Gateway (SGW), Supervisor Mechanism (SUP), Session Specific Extension (SSE), Called Station Identification (CSID), Mobility Management Entity (MME), Access Point Name (APN), Border Gateway Function (BGF), Interconnect-BGF (I-BGF), Core-BGF (C-BGF), Packet Data Serving Node (PDSN), Packet Data Network (PDN), Dynamic Host Configuration Protocol (DHCP), Proxy Mobile IP (PMIP), and Application Function (AF).

Also provided in the architecture of FIG. 1 is a series of interfaces, which can offer policy control, AAA functions, and charging activities for various network elements. For example, interfaces can be used to exchange location and access data for one or more end users. Resource, accounting, location, access network information, network address translation (NAT) control, etc. can be exchanged using a remote authentication dial in user service (RADIUS) protocol, or any other suitable protocol where appropriate. Other protocols to be used in such communications can include Diameter, service gateway interface (SGI), terminal access controller access-control system (TACACS), TACACS+, etc.

A home PCRF or a visited PCRF can be used to relay location information, access network information, support NAT/NAT-traversal, Rx+/Gq'-operations, etc. I-BGFs can reside between PDNs and alternatively be integrated with other elements within the architecture. For the S9 interface, there is policy peering to support NAT control, location-information, and access network information transfer. For policy peering (PCRF to PCRF), the S9 (Gx/Rx and Ri') interface can be used.

Note that 3GPP (e.g., Release 8) defines the Evolved Packet System (EPS) as specified in TS 23.401, TS.23.402, TS 23.203, etc. The EPS consists of IP access networks and an Evolved Packet Core (EPC). Access networks may be 3GPP access networks, such a GERAN, UTRAN, and E-UTRAN (LTE) or they may be non-3GPP IP access networks such as DSL, Cable, WiMAX, code division multiple access (CDMA) 2000, WiFi, or the Internet. Non-3GPP IP access networks can be divided into trusted and untrusted segments. Trusted IP access networks support mobility, policy, and AAA interfaces to the EPC, whereas untrusted networks do not. Instead, access from untrusted networks is done via the evolved Packet Data Gateway (ePDG), which provides for IPSec security associations to the user equipment over the untrusted IP access network. The ePDG (in turn) supports mobility, policy, and AAA interfaces to the EPC, similar to the trusted IP access networks.

Currently, long term evolution (LTE) networks represent the last step toward the 4th generation (4G) of radio technologies designed to increase the capacity and the speed of mobile networks. Mobile carriers are transitioning in order to convert their networks to the LTE network paradigm. For practical operating terms, code division multiple access (CDMA) operators would like to continue using their existing networks when migrating to the LTE network. Any mobility solution for subscribers should account for roaming between the access networks (i.e., with session continuity). A direct upgrade to the 3GPP TS 23.402 architecture is time-consuming, expensive and, further, potentially destabilizing to network communications. The challenge lies in providing a mobility solution that meets the requirements of mobility between a legacy CDMA network and an LTE network.

3GPP has defined the TS 23.402 architecture that supports mobility between 3GPP networks (such as LTE) and non-3GPP2 networks (such as CDMA). This typically requires a PDSN to be upgraded to a high rate packet data (HRPD) Serving Gateway (HSGW), the PGW to be upgraded with an integrated Mobile IPv4 Home Agent function, and an upgrade to the AAA/HSS interface to associate the subscriber with a PGW. CDMA operators that do not migrate directly and completely to this architecture can experience problems in the network.

Example embodiments of the present disclosure provide a technique that provides a mobility solution that meets the requirements of mobility between a legacy CDMA network and an LTE network. Such a solution does not involve unnecessary enhancements to a PDSN element, or any type of cumbersome linking of AAA element 24 with HSS 18. Communication system 10 can offer an IP mobility solution via a collaborative 3GPP2 home agent (e.g., via home agent module 16), which has a logical interface with PDN gateway 14 for roaming between CDMA and LTE networks. In a general sense, home agent module 16 maintains the same interface to a legacy PDSN and an existing interface to AAA element 24 (e.g., a RADIUS server). PDN gateway 14 can include standard functional interfaces, along with certain enhancements to foster the IP mobility solution detailed herein. In addition, inter-process communication (IPC) can be used between home agent module 16 and PDN gateway 14 to establish and to maintain the IP session for the subscriber, when attached on either an LTE network or a CDMA network.

In operation, IPC can be employed between any standalone home agent and PDN gateway 14 to support mobility across LTE and CDMA networks. In addition, communication system 10 can support the use of a legacy PDSN, which would obviate the need to upgrade to an HSGW. Also, routing can be aggregated, unless the subscriber is no longer on the initially attached network. The architecture can offer optimal routing to the gateway that is serving the subscriber (e.g., a host route or subnet route on the SUP/adjacent router). Note that such an approach is different from a 3GPP TS 23.402-based solution in the sense that the subscriber is not associated with PDN gateway 14 by HSS 18.

In one conceptual sense, PDN gateway 14 can function as a home agent. PDN gateway 14 becomes an effective mobility anchor for the architecture. This would apply to all technologies within the 3GPP access portfolio. The 3GPP access can be anchored by serving gateway 28, which can effectively handle the appropriate mobility functions.

PDN gateway 14 also has the intelligence to coordinate amongst non-3GPP IP access. There are two access cases represented in FIG. 1, which depicts these as trusted and untrusted non-3GPP IP access. For the trusted scenario, a viable relationship exists between the service provider and the core network. For the untrusted scenario, a suitable security mechanism can be provided to ensure the integrity of the data communications (e.g., encryption and decryption operations can occur in this scenario and, further, involve an evolved packet data gateway (ePDG), which has a logical connection to a vPCRF as shown in FIG. 1). Note that the ePDG can have a connection to the hPCRF (or more generally, a connection to any type of PCRF element).

A given PCRF can use subscription information as a basis for the policy and charging control decisions. The subscription information may apply for both session-based and non-session based services. The PCRF can maintain session linking to the sessions, where the assigned Home Address (HoA) and user equipment (UE) identity are equal. The AF can be an element offering applications that require dynamic policy and/or charging control. The AF can communicate with the PCRF to transfer dynamic session information. The AF may receive an indication that the service information is not accepted by the PCRF together with service information that the PCRF would accept. In that case, the AF can reject the service establishment towards the UE. If possible, the AF forwards the service information that the PCRF would accept to the UE.

HSS 18 offers a subscriber database in GSM environments. In one sense, HSS 18 can provide functions similar to those offered by an AAA server in a CDMA environment. When the user moves to 3GPP access, HSS 18 can be aware of his location and his anchor point (i.e., PDN gateway 14). Additionally, HSS 18 can communicate with AAA element 24 such that when the user moves to a CDMA environment, he has an effective anchor for his communications. HSS 18 and AAA element 24 can coordinate this state information for the user (and synchronize this information) to achieve his mobility. No matter how the user moves, the access gateway can be interacting with either HSS 18 or AAA element 24 in order to identify which gateway should receive the appropriate signaling. The route to end user 12 is consistently maintained, where routing topology ensures that data is sent to the correct IP address. Thus, synchronization activity on the backend of the architecture allows mobility to be achieved for the user when operating in different environments. Additionally, in certain examples, PDN gateway 14 performs PDSN functions along with home agent functions in order to achieve these objectives. Subscriber profile databases 26*a-b* can each include anchor gateway information for particular users for which they are designated responsibility.

In regards to the mobile node IP address anchor, there are two service application module IP (SAMI) elements: the home agent and the packet gateway (PGW). [Note that these two elements could equate to home agent module 16 and PDN gateway 14, as illustrated in FIG. 1.] The home agent (HA) IP address and PGW IP address can be different. IP session continuity can be maintained for the mobile node IP address (i.e., in the context of a handover between CDMA and LTE). In terms of routing, the mobile node's IP prefix can be advertised by the SUP. Internal forwarding can be executed, where the SUP can send traffic based on the mobile node IP prefix that is associated with the gateway, which owns the address pool. In terms of the user group, the HA and PGW are configured to serve dual-stack mobile nodes, where the gateways are aware of peer gateways. Also, there is an APN-level configuration on the PGW, and a realm-level configuration on the home agent. The IP address pool can be configured on the HA and the PGW.

For the AAA considerations, an AAA mechanism may provide the mobile node IP address and the accounting session identification (Acct-Session-ID) and other mobile node states in appropriate messaging (e.g., via an access-Request/access-Accept message). An accounting message can be sent for the following events: accounting-start when the IP session is initially created for the mobile node on the gateway; accounting-interim-update when a handover occurred between gateways; and an accounting-stop when the IP session is removed from the gateway serving the element. For roaming scenarios, the home routed case is fully supported by the architecture.

Note that communication system 10 offers an approach to mobility that can leverage a legacy PDSN (e.g., serving gateway 28) and an AAA element in a CDMA network without having to upgrade or to link the AAA element and the HSS component. In addition, in certain examples presented herein, aggregating a home agent and a PDN gateway can deliver a solution quickly with independent mobile gateways, thereby exposing only relevant application program interfaces (APIs) via the IPC signaling. Additionally, such a solution is standards compliant for 3GPP2 on a legacy CDMA network, and for 3GPP on a LTE network.

Before turning to some of the operations of this architecture, a brief discussion is provided about the infrastructure of FIG. 1. End user 12 can be associated with clients or customers wishing to initiate a flow in communication system 10 via some network. The terms 'mobile node' and 'subscriber' are both inclusive of devices used to initiate a communication, such as a computer, a personal digital assistant (PDA), a laptop or electronic notebook, a cellular telephone, an i-Phone, an IP phone, or any other device, component, element, or object capable of initiating voice, audio, video, media, or data exchanges within communication system 10. End user 12 may also be inclusive of a suitable interface to the human user, such as a microphone, a display, a keyboard, or other terminal equipment. End user 12 may also be any device that seeks to initiate a communication on behalf of another entity or element, such as a program, a database, or any other component, device, element, or object capable of initiating an exchange within communication system 10. Data, as used herein in this document, refers to any type of numeric, voice, video, or script data, or any type of source or object code, or any other suitable information in any appropriate format that may be communicated from one point to another. In certain embodiments, end user 12 has a bundled subscription for network access and application services (e.g., voice), etc. Once the access session is established, the user can register for application services as well, without additional authentication requirements. There can be two different user data repositories (AAA databases): one for the access user profile and one for the application user profile. IP addresses can be assigned using DHCP, or any suitable forms thereof.

In one example implementation, HSS 18, PDN gateway 14, serving gateway 28, and AAA element 24 are network elements that facilitate or otherwise help coordinate mobility management (e.g., for networks such as those illustrated in FIG. 1). As used herein in this Specification, the term 'network element' is meant to encompass network appliances, servers, routers, switches, gateways, bridges, loadbalancers, firewalls, processors, modules, or any other suitable device, component, element, or object operable to exchange information in a network environment. Moreover, the network elements may include any suitable hardware, software, components, modules, interfaces, or objects that facilitate the operations thereof. This may be inclusive of appropriate algorithms and communication protocols that allow for the effective exchange of data or information.

In one example implementation, HSS 18, PDN gateway 14, and/or AAA element 24 include software (e.g., as part of home agent module 16, subscriber profile database 26*a-b*, etc.) to achieve, or to foster, the mobility management operations, as outlined herein in this document. In other embodiments, this feature may be provided external to these elements, or included in some other network device to achieve this intended functionality. Alternatively, both elements include software (or reciprocating software) that can coordinate in order to achieve the operations, as outlined herein. In still other embodiments, one or both of these devices may include any suitable algorithms, hardware, software, components, modules, interfaces, or objects that facilitate the operations thereof.

In regards to the internal structure associated with communication system 10, each of HSS 18, PDN gateway 14, and/or AAA element 24 can include memory elements for storing information to be used in achieving the mobility management operations, as outlined herein. Additionally, each of these devices may include a processor that can execute software or an algorithm to perform the mobility management activities as discussed in this Specification. These devices may further keep information in any suitable memory element [random access memory (RAM), ROM, EPROM, EEPROM, ASIC, etc.], software, hardware, or in any other suitable component, device, element, or object where appropriate and based on particular needs. Any of the memory items discussed herein should be construed as being encompassed within the broad term 'memory element.' The information being tracked or sent by end user 12, HSS 18, PDN gateway 14, and/or AAA element 24 could be provided in any database, register, control list, or storage structure: all of which can be referenced at any suitable timeframe. Any such storage options may be included within the broad term 'memory element' as used herein in this Specification. Similarly, any of the potential processing elements, modules, and machines described in this Specification should be construed as being encompassed within the broad term 'processor.' Each of the network elements and user equipment (e.g., mobile nodes) can also include suitable interfaces for receiving, transmitting, and/or otherwise communicating data or information in a network environment.

Note that in certain example implementations, the mobility management functions outlined herein may be implemented by logic encoded in one or more tangible media (e.g., embedded logic provided in an application specific integrated circuit [ASIC], digital signal processor [DSP] instructions, software [potentially inclusive of object code and source code] to be executed by a processor, or other similar machine, etc.). In some of these instances, memory elements [as shown in FIG. 1] can store data used for the operations described herein. This includes the memory elements being able to store software, logic, code, or processor instructions that are executed to carry out the activities described in this Specification. A processor can execute any type of instructions associated with the data to achieve the operations detailed herein in this Specification. In one example, the processors [as shown in FIG. 1] could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array [FPGA], an erasable programmable read only memory (EPROM), an electrically erasable programmable ROM (EEPROM)) or an ASIC that includes digital logic, software, code, electronic instructions, or any suitable combination thereof.

Figure 2A:
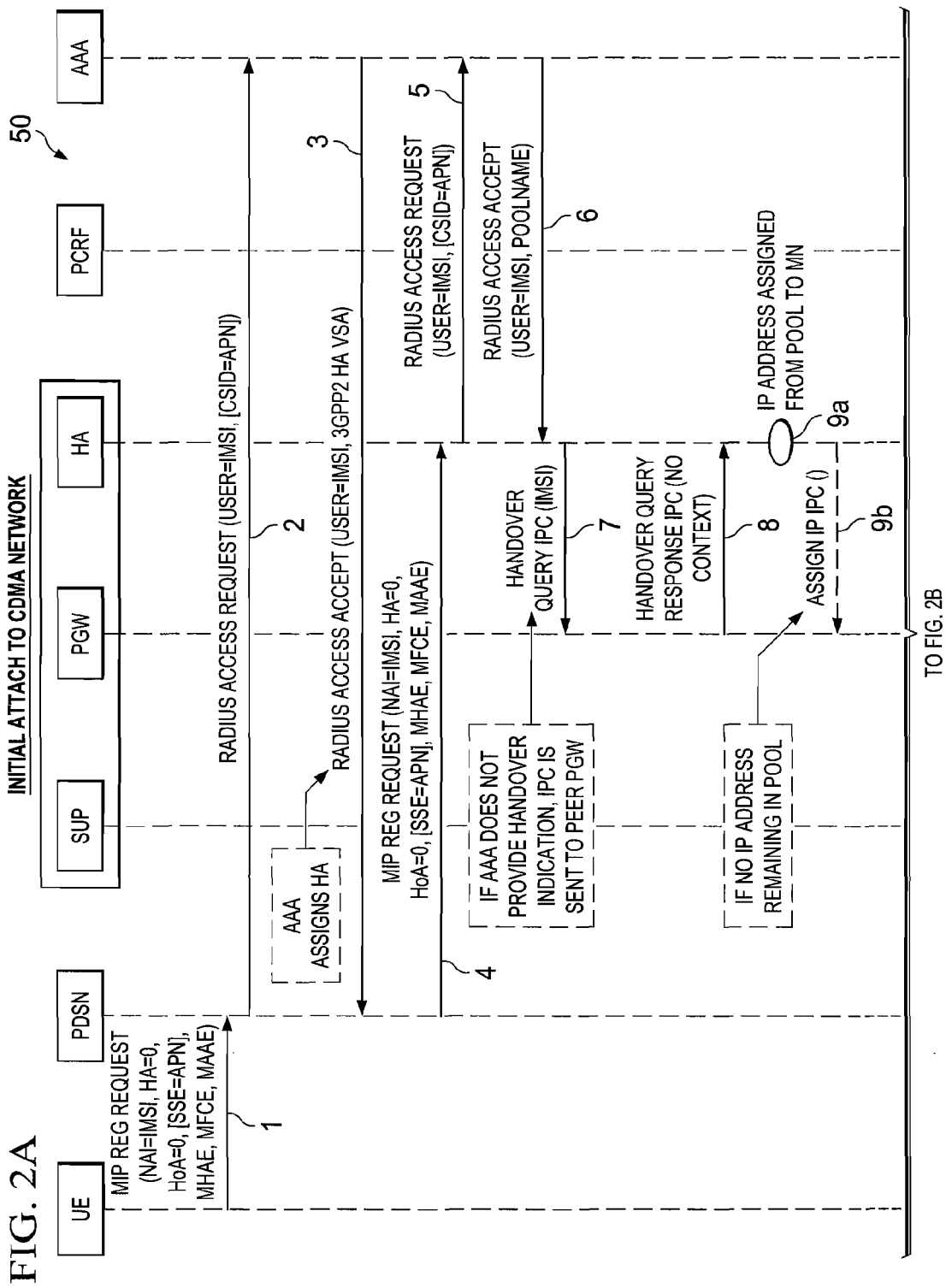

FIG. 2A is a simplified flow diagram 50 illustrating an initial attachment to a CDMA network. This particular flow involves user equipment (UE), a PDSN (e.g., serving gateway 28), a PCRF, and an AAA element. In addition, this particular flow includes a hatched box (indicative of a potential integration of these elements being included in a single device) that may include a supervisor mechanism (e.g., a SUP), a packet gateway (PGW), and a home agent (HA) element. Note that these items (within the hatched box) may be included in a single PDN gateway 14 in particular embodiments presented herein. The supervisor mechanism can be inclusive of a network card or blade that can include routing software. Additionally, the supervisor mechanism can advertise prefixes for the IP address of the mobile node. The supervisor mechanism can provide forwarding along the routing path to the appropriate gateway, where that gateway would be responsible for tunneling to the mobile node at its current location.

This particular flow begins at step 1, where a mobile IP registration request occurs. This can include the network access identifier (NAI) being set to the international mobile subscriber identity (IMSI), where the home agent is set equal to zero. More directly, the signaling includes: a mobile IP (MIP) registration request (NAHMSI, HA=0, Home Address (HoA)=0, [SSE=APN], Mobile-Home Authentication Extension (MHAE), Mobile Node-Foreign Agent (MN-FA) Challenge Extension (MFCE), mobile node AAA Authentication Extension (MAAE)). Note that the NAI (which is used in the mobile IP scenario) is equal to the IMSI (which is used in the GTP scenario for the PDN gateway). This offers an effective linkage for commonly identifying the mobile node, as it moves between different access networks.

At step 2, a RADIUS access request is communicated from the PDSN (e.g., serving gateway 28) to the AAA element. The called station identification (CSID) is set equal to the APN, which can include signaling such as: RADIUS access Request (user=IMSI, [CSID=APN]). At step 3, the AAA element assigns a home agent, where the signaling is provided as: RADIUS access Accept (user=IMSI, 3GPP2 HA vendor specific attributes (VSA)). At step 4, the PDSN makes a registration request, which can be provided as: MIP Reg Request (NAHMSI, HA=0, HoA=0, [SSE=APN], MHAE, MFCE, MAAE). The home agent in this scenario responds with a RADIUS access request that is sent to the AAA element. This can include signaling illustrated in step 5, which may include: RADIUS access Request (user=IMSI, [CSID=APN]).

At step 6, a RADIUS access accept message is communicated to the home agent, where the signaling is provided as: USER=IMSI, POOLNAME. At step 7, a handover query is sent to the packet gateway. Note that if the AAA element does not provide a handover indication, the inter-process communication (IPC) is sent to the peer packet gateway. At step 8, the handover query response IPC is sent to the home agent with no context. An IP address is assigned from a pool to the mobile node at step 9a, where if no IP address is remaining in the pool then an assignment of an IP IPC occurs at step 9b.

Figure 2B:
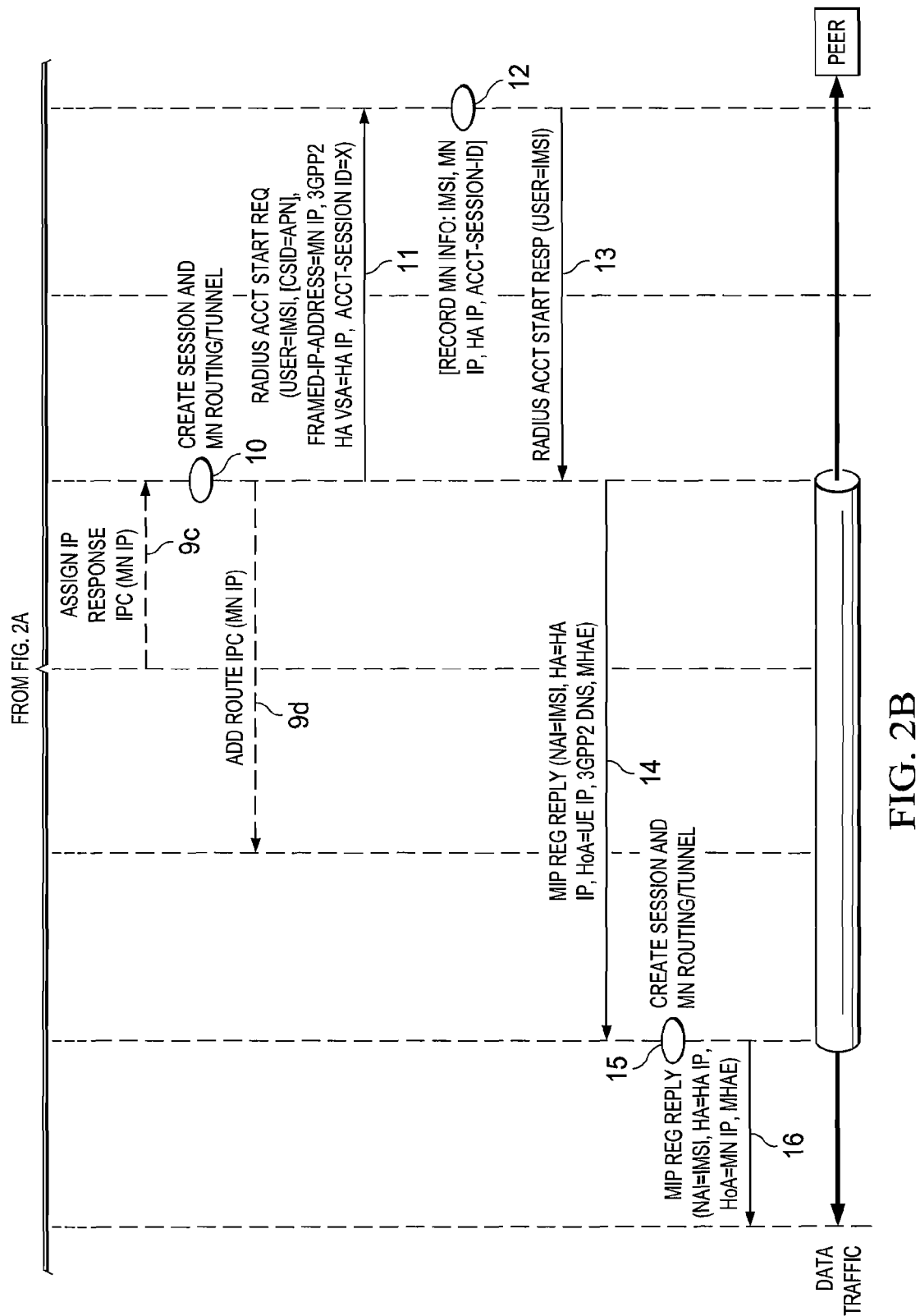

FIG. 2B continues this flow, where at step 9c there is a response for the mobile node IP address. Step 9d includes an add route IPC for the mobile node IP address, where step 10 involves creating a session and mobile node routing tunnel. At step 11, signaling is provided for the RADIUS accounting request, which (in this example) is depicted as: RADIUS Acct Start Req (user=IMSI, [CSID=APN], Framed-IP-Address=MN IP, 3GPP2 HA VSA=HA IP, Acct-Session ID=X). At step 12, a recordation is made for the mobile node information, including the mobile node IP address, the home agent IP address, the IMSI, etc. At step 13, the AAA element sends a RADIUS accounting start response to the home agent, which subsequently sends a mobile IP registration reply at step 14. This may include signaling such as: MIP Reg Reply (NAHMSI, HA=HA IP, HoA=UE IP, 3GPP2 DNS, MHAE). At step 15, the session is created and the mobile node routing and tunneling is established. At step 16, a mobile IP registration reply is sent back to the user equipment and data traffic commences over the network.

Figures 2, 3A:
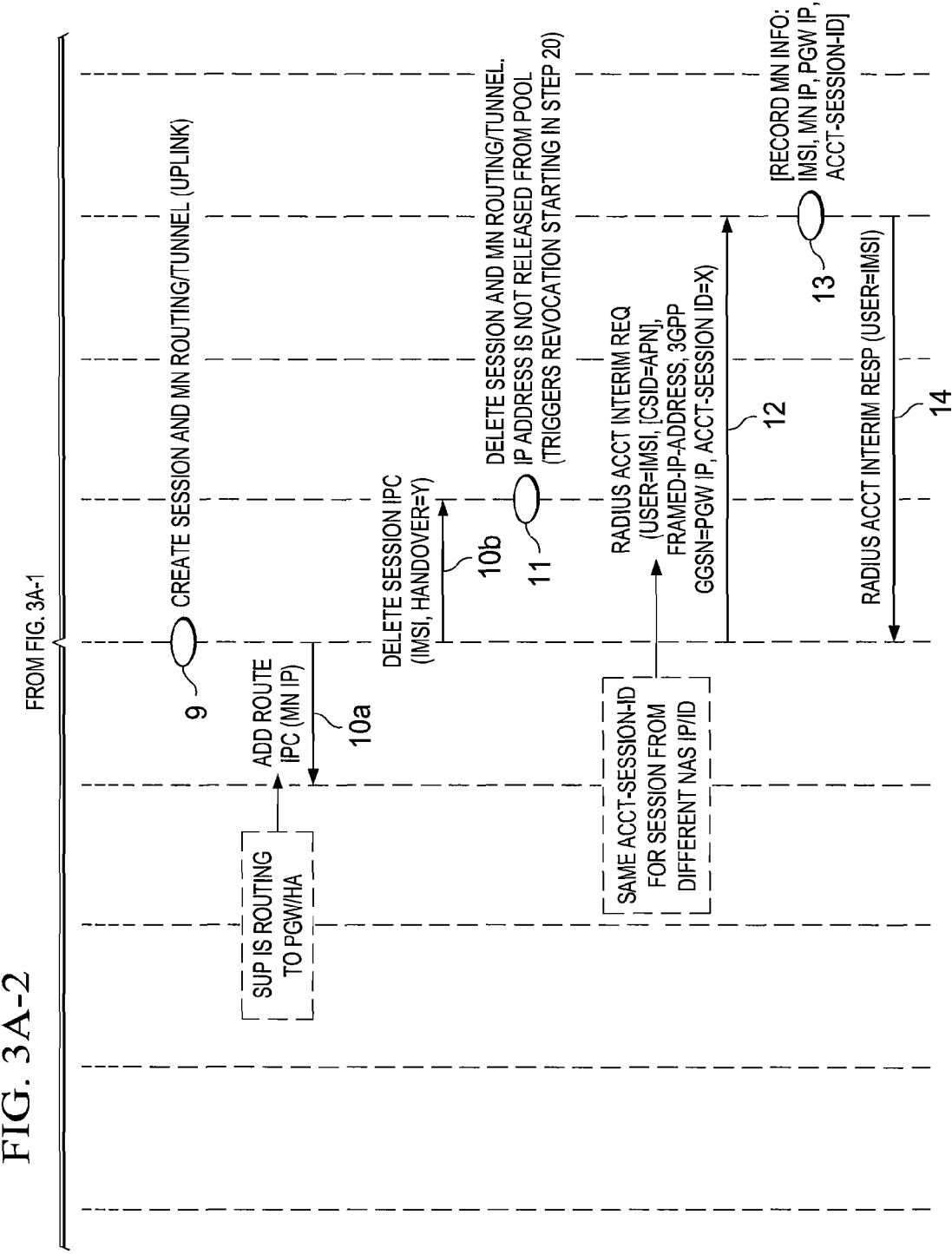
Figure 3B:
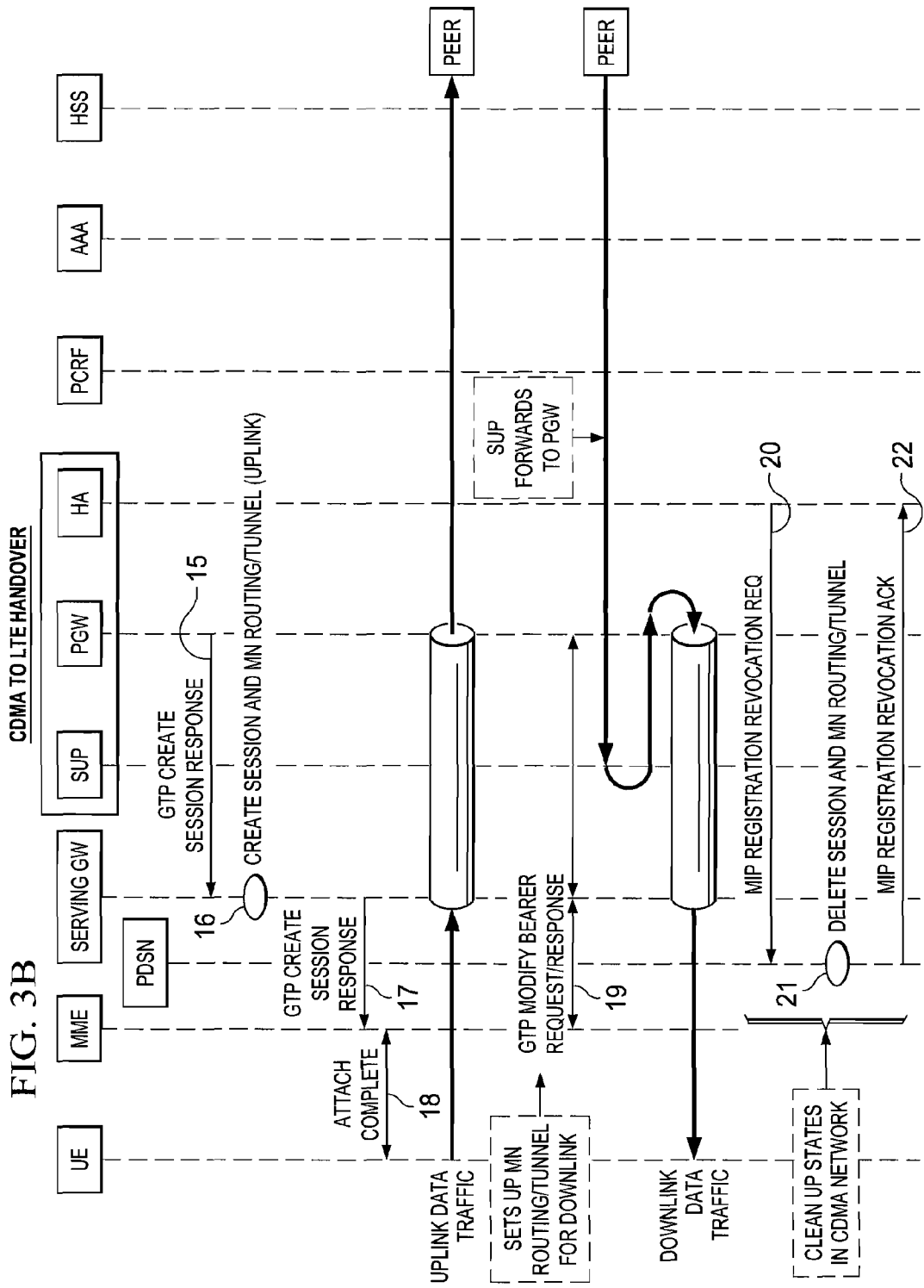

FIGS. 3A-1-2 illustrate an example CDMA to LTE handover occurring for the mobile node. The method can begin at step 1, where an attach (APN)/Identity request/response is sent to the MME. At step 2, an authentication/security mechanism occurs and the home subscriber server (HSS) assigns a packet gateway for this particular session. At step 3, a GTP create session request is sent and may include the IMSI, APN, PGW. At step 4, a GTP create session request (e.g., including the IMSI, APN) is sent to the packet gateway. At step 5, a RADIUS access request may be sent to the AAA element and this messaging may include the user=IMSI, CSID=APN. At step 6, a RADIUS access accept may be communicated and this may include the user=IMSI, [UE IP VSA, Acct-Session-ID VSA, 3GPP2 HA VSA]. At step 7, a handover query IPC may be provided and it may include the associated IMSI. Note that if the AAA element does not provide the handover indication, then the IPC is sent to the peer packet gateway. At step 8, a handover query response IPC is sent from the home agent to the packet gateway and this signaling can include the mobile node IP address, Acct-Session-ID, IP owner, etc. Note that the CDMA to LTE handover is indicated in the context transfer, where the mobile node IP address is marked as being originated at the home agent.

At step 9, a session is created with the mobile node routing/tunneling (and the uplink is established). At step 10*a*, the packet gateway adds the route IPC (MN IP), where the SUP is routing to the packet gateway/home agent. At step 10*b*, the session IPC (IMSI, Handover=Y) is deleted. At step 11, the session and MN routing/tunnel is deleted. The IP address is not released from the pool (e.g., this triggers a revocation starting in step 20). At step 12, a RADIUS accounting interim request [Acct Interim Req (user=IMSI, [CSID=APN]], is sent to the AAA element. Note that this can represent the same accounting session-ID for the session from a different network access server (NAS). At step 13, the mobile node information is recorded, which can include: IMSI, mobile node IP address, PGW IP, Acct-Session-ID. At step 14, the RADIUS accounting interim response is sent to the packet gateway and this may include user=IMSI.

At step 15, the packet gateway can send a session creation response to the serving gateway (serving GW). The serving gateway can create the session and the mobile node routing/tunnel. At step 17, a GTP create session response is sent to the MME, where an attach complete signal is sent to the user equipment at step 18. Uplink data traffic occurs at this juncture. At step 19, a GTP modify bearer request/response occurs between the MME and the packet gateway. Forwarding occurs via the SUP to the packet gateway, where downlink data traffic is sent back to the user equipment. At step 20, mobile IP registration revocation is requested, where the session and routing/tunnel can be subsequently deleted. In a general sense, states are being cleaned up in the CDMA network at this juncture. At step 22, there is an acknowledgment for the mobile IP registration revocation.

Figures 1, 4A:
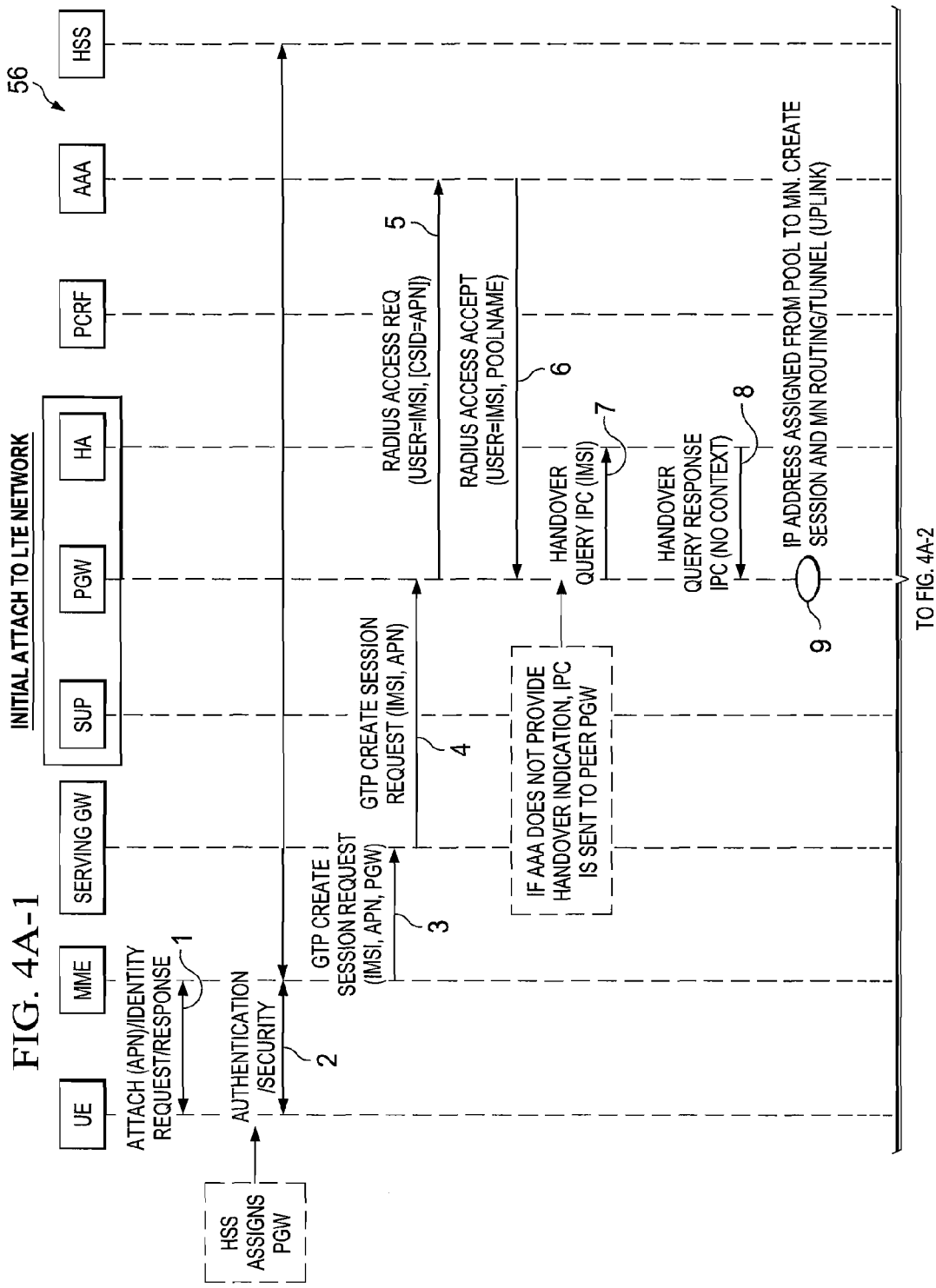
Figures 2, 4A:
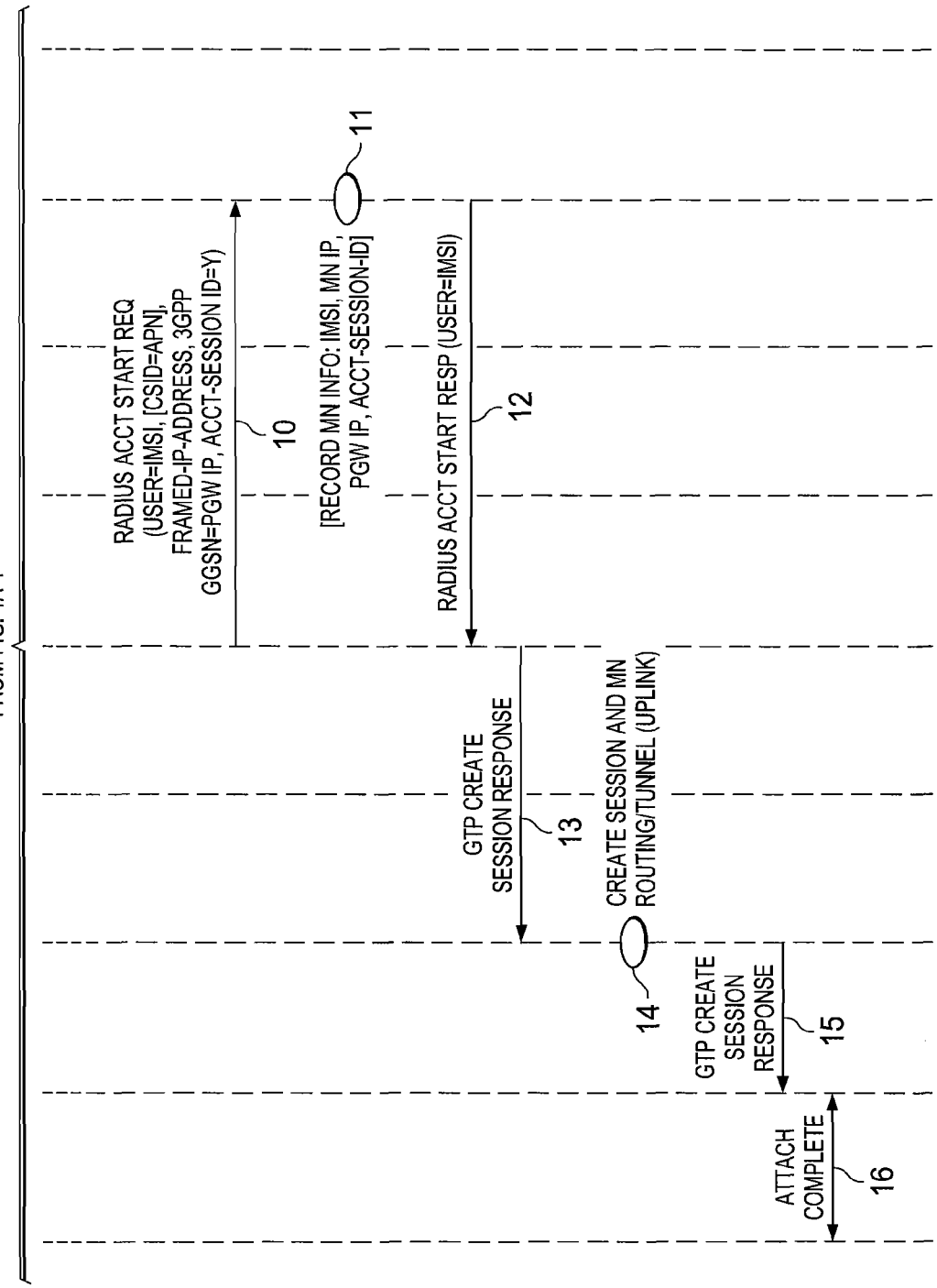

FIGS. 4A-1-2 are simplified flow diagrams (labeled generally at 56) illustrating an initial attachment to the LTE network. This particular flow begins at step 1, where there is an attach (APN)/identity request/response mechanism that occurs between the user equipment and the MME. At step 2, authentication and security occurs between these two elements, where the HSS assigns a packet gateway for the flow. Note that in many implementations, the HSS knows the current MME, SGSN, or AAA server, the serving gateway (for 3GPP access), and the PDN gateway. Also, the MME/SGSN knows the initial location information/cell-ID (upon attachment or handover), the tracking area, the serving gateway, and the PDN gateway. The PCRF can know the initial location information/cell-ID (upon attachment or handover) (e.g., provided via S7). The AAA server can know the PDN gateway assigned and [potentially] the initial location information from non-3GPP IP access.

At step 3, a GTP create session request is sent to the serving gateway. At step 4, the GTP create session request can be sent to the packet gateway, where these requests may include items such as the associated APN, IMSI, etc. At step 5, a RADIUS access request is sent to the AAA element, which responds with a RADIUS accept message being forwarded to the packet gateway. At step 7, the handover query IPC (e.g., with an IMSI) can be sent to the home agent. If the AAA element does not provide a handover indication, then the IPC can be sent to the peer packet gateway. At step 8, the handover query response IPC (having no context) is sent to the packet gateway. At step 9, the IP address is assigned (e.g., from an address pool) to the mobile node. In addition, a session is created, along with the mobile node routing/tunnel.

Figure 4B:
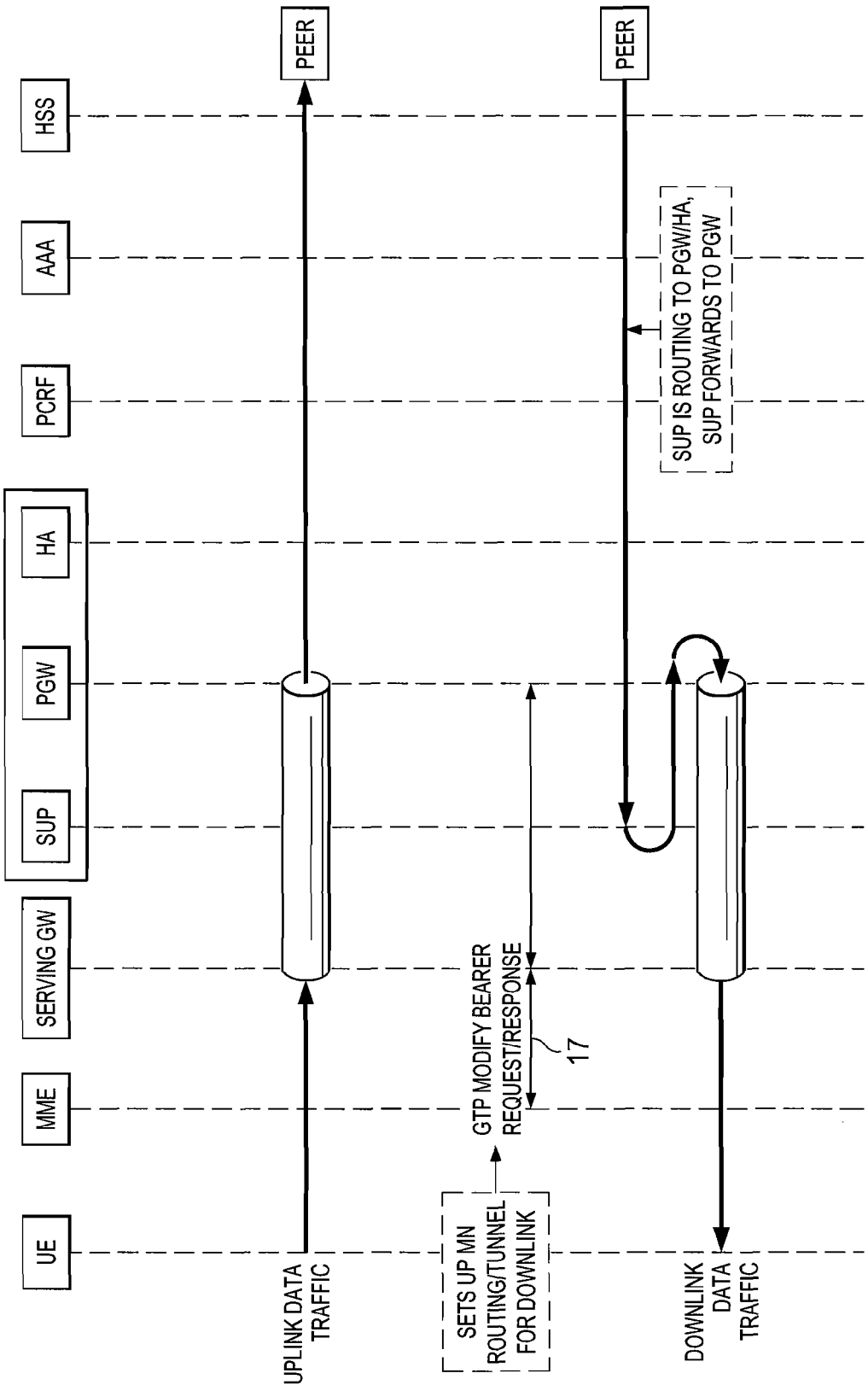

At step 10, a RADIUS accounting start request is sent from the packet gateway to the AAA element. At step 11, the mobile node information is recorded and this may include items such as the IMSI, mobile node IP address, packet gateway IP address, accounting session identifier, etc. At step 12, a RADIUS accounting start response is sent to the packet gateway, where the GTP create session response is forwarded to the serving gateway at step 13. At step 14, the session and the mobile node routing/tunnel are created. At step 15, the GTP create session response is sent to the MME, where signaling occurs between the user equipment and the MME to signal that the attachment is complete. FIG. 4B simply reflects the uplink data traffic occurring between the user equipment and the HSS. In addition, step 17 shows a GTP modify bearer request/response that occurs between the packet gateway and the MME. This can establish the mobile node routing/tunnel for the downlink. Finally, the SUP routes to the packet gateway/home agent, where forwarding occurs by the SUP toward the packet gateway.

Figures 1, 5A:
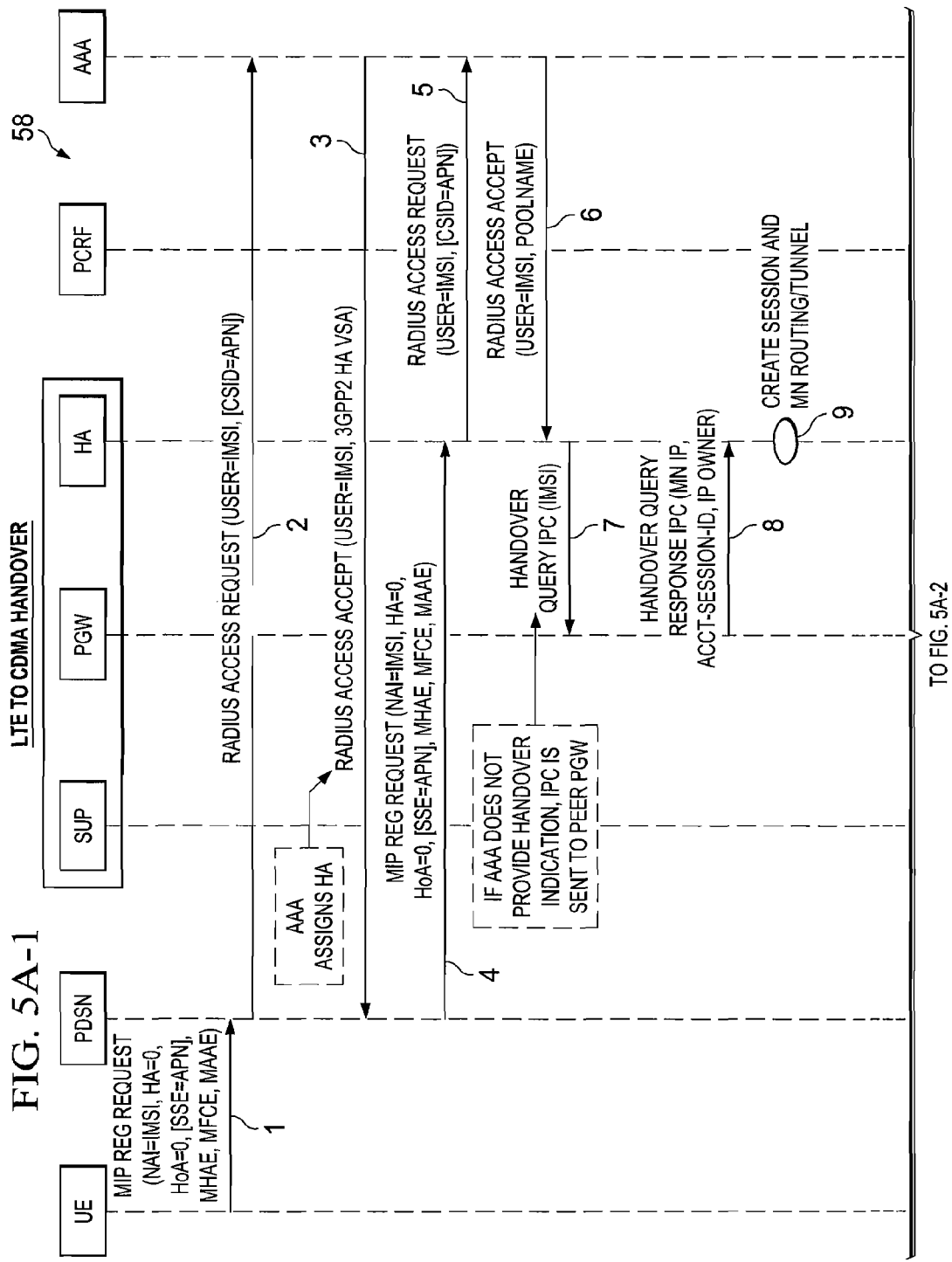
Figures 2, 5A:
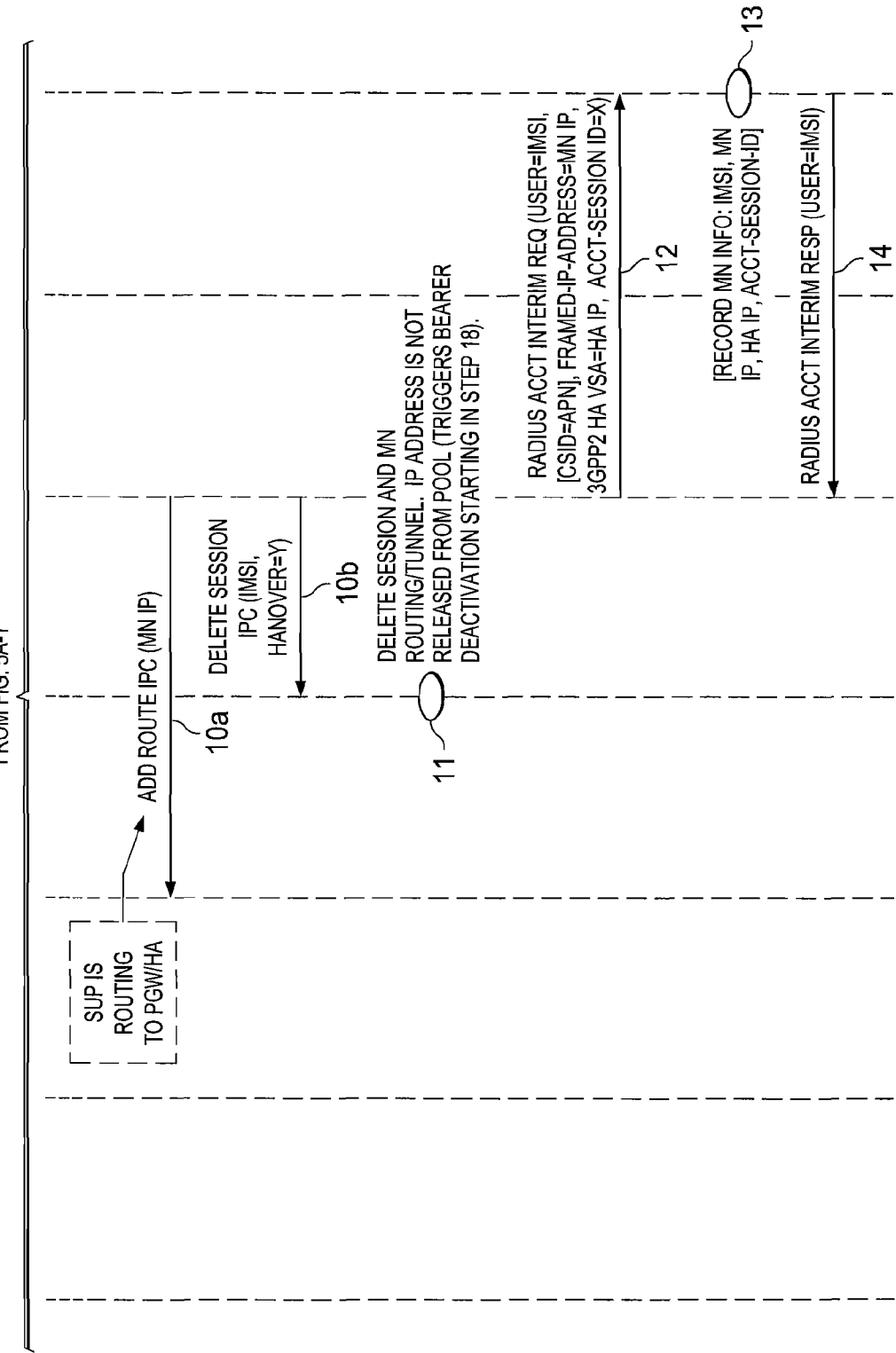

FIGS. 5A-1-2 are simplified flow diagrams (labeled generally at 58) illustrating an LTE to CDMA network handover. The flow begins at step 1, where there is a mobile IP registration request. At step 2, a RADIUS access quest is passed between the PDSN and the AAA element. At step 3, a RADIUS access accept message is sent to the PDSN, where the AAA assigns a home agent. The PDSN sends a mobile IP address registration request to the home agent at step 4. A RADIUS access request is sent at step 5 to the AAA element. At step 6, a RADIUS access accept message is sent to the home agent. If the AAA element does not provide a handover indication, then the IPC is sent to the peer packet gateway. At step 7, the handover query is issued from the home agent and this is communicated to the packet gateway. At step 8, the handover query response is sent to the home agent, where a session is created at step 9. At step 10*a*, the home agent communicates a message indicating to add the route (via IPC) for the mobile node IP address. Note that the SUP can route to the packet gateway/home agent. At step 10*b*, the session is deleted, where the signaling may be provided as: IMSI, handover=Y. At step 11, the session is deleted. The IP address is not released from the pool at this juncture. At step 12, the home agent sends a RADIUS accounting interim request, which may be provided as: RADIUS Acct Interim Req (user=IMSI, [CSID=APN], Framed-IP-Address=MN IP, 3GPP2 HA VSA=HA IP, Acct-Session ID=X).

At step 13, mobile node information is recorded and this may include the IMSI, the mobile node IP address, the home agent IP address, etc. At step 14, a RADIUS accounting interim response is sent from the AAA element to the home agent. FIG. 5B continues along with this flow, where step 15 depicts a mobile IP registration reply from the home agent to the PDSN. At step 16, a session is created for the mobile node routing and tunneling. At step 17, the PDSN signals the mobile IP registration reply to the user equipment. At step 18, the GTP delete bearer request is sent to the MME/serving gateway. At step 19, the session is deleted, where a GTP delete bearer response is sent to the packet gateway at step 20. Steps 18-20 illustrate states being cleaned up in the LTE network. Following these operations, uplink data traffic occurs between the user equipment and the AAA element. The SUP routes to the packet gateway/home agent, where downlink data traffic occurs between the user equipment and other components in the network.

Figure 6:
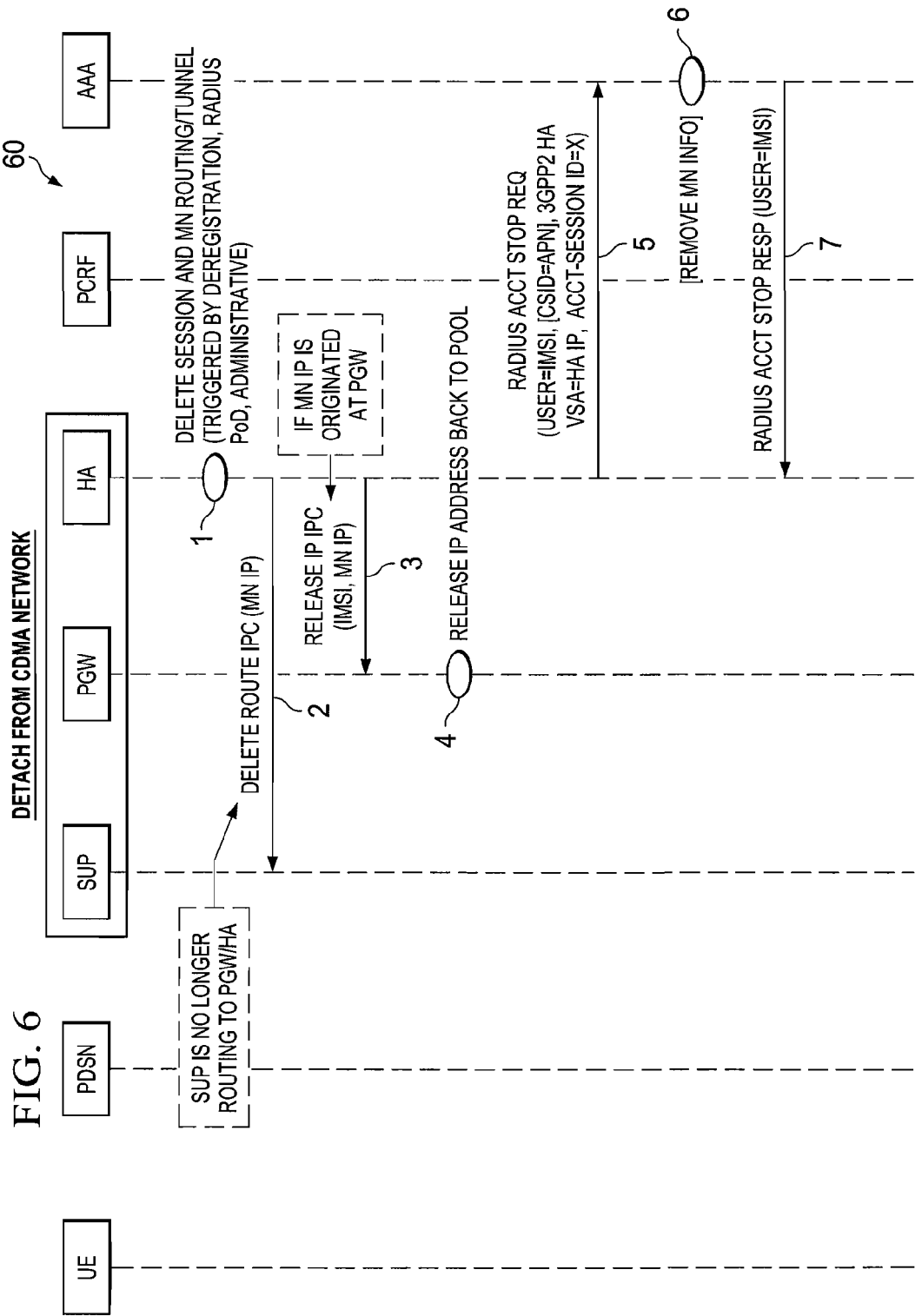

FIG. 6 is a simplified flow diagram 60 illustrating a detachment from the CDMA network. The flow begins at step 1, where a session is deleted and the mobile node routing and tunneling is also removed. At step 2, the route IPC is deleted, where the SUP is no longer routing to the packet gateway/home agent. At step 3, the IP IPC is released if the mobile node IP address was originated at the packet gateway. At step 4, the IP address is released back to the address pool. At step 5, a RADIUS accounting stop request is sent from the home agent to the AAA element. At step 6, the mobile node information is removed at the AAA element. At step 7, the RADIUS accounting stop response is sent from the AAA element to the home agent.

Figure 7:
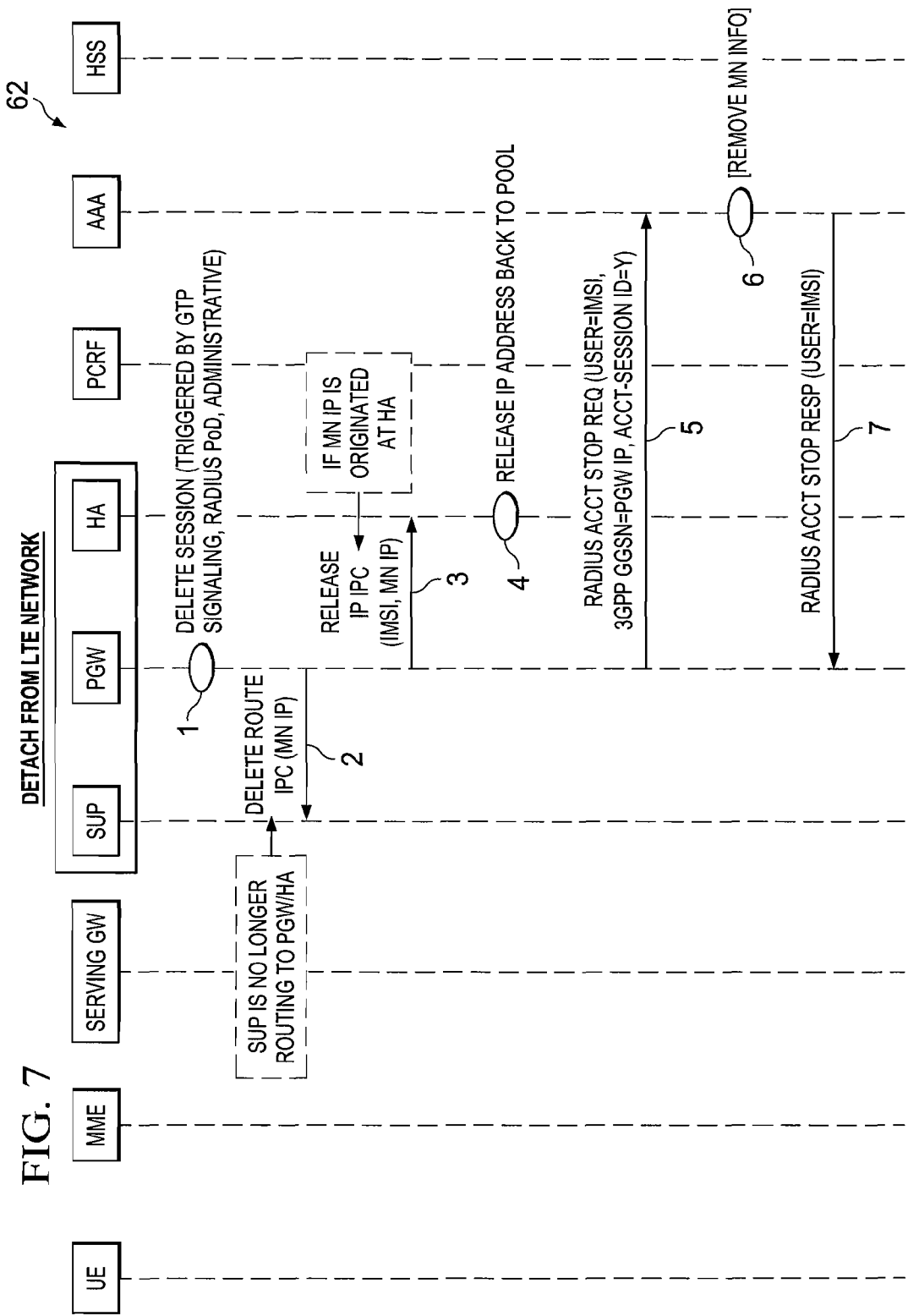

FIG. 7 is a simplified flow diagram 62 illustrating a detachment from the LTE network. The flow begins at step 1, where the session is deleted at the packet gateway. At step 2, the route IPC is deleted, where the SUP is no longer routing to the packet gateway/home agent. The IP IPC is released at step 3, if the mobile node IP address is originated at the home agent. At step 4, the home agent releases the IP address back into the IP address pool. At step 5, the packet gateway sends a RADIUS accounting stop request to the AAA element. At step 6, the AAA element removes the mobile node information. At step 7, a RADIUS accounting stop response is sent from the AAA element to the packet gateway.

Note that with the example provided above, as well as numerous other examples provided herein, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that communication system 10 (and its teachings) are readily scalable and further can accommodate a large number of components, as well as more complicated/sophisticated arrangements and configurations. Accordingly, the examples provided should not limit the scope or inhibit the broad teachings of communication system 10 as potentially applied to a myriad of other architectures.

It is also important to note that the steps in FIGS. 2A-7 illustrate only some of the possible signaling scenarios and patterns that may be executed by, or within, communication system 10. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 10 in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access, and broadcast protocols, communication system 10 may be applicable to other exchanges, routing protocols, or routed protocols in which packets (not necessarily the routing protocol/packets described) are exchanged in order to provide mobility data, connectivity parameters, access management, etc. Moreover, although communication system 10 has been illustrated with reference to particular elements and operations that facilitate the communication process, these elements and operations may be replaced by any suitable architecture or process that achieves the intended functionality of communication system 10.

In a separate endeavor, communication system 10 may generally be configured or arranged to represent a 3G architecture applicable to UMTS environments in accordance with a particular embodiment. However, the 3G architecture is offered for purposes of example only and may alternatively be substituted with any suitable networking system or arrangement that provides a communicative platform for communication system 10. In other examples, FIG. 1 could readily include a serving general packet radio service (GPRS) support node (SGSN), a gateway GPRS support node (GGSN), any type of network access server (NAS), etc. and all of these elements could interface with an authentication, authorization, and accounting (AAA) server. Moreover, the present disclosure is equally applicable to other cellular and/or wireless technology including Wi-Fi, WiMax, etc.

Numerous other changes, substitutions, variations, alterations, and modifications may be ascertained to one skilled in the art and it is intended that the present disclosure encompass all such changes, substitutions, variations, alterations, and modifications as falling within the scope of the appended claims.

What is claimed is:

1. A method, comprising:
receiving a packet for a flow associated with a subscriber;
determining if a context exists for the flow by using a handover query to a packet gateway, wherein authentication and security parameters are negotiated before determining whether the context exist for the flow;
assigning an Internet protocol (IP) address for the subscriber, by the packet gateway, in response to a home agent element not having the context for the flow; and
creating, by the packet gateway, a session for the subscriber, wherein the session is created using inter-process communication between the home agent element and the packet gateway, and wherein the session is maintained for a handover involving the subscriber roaming between a Long Term Evolution (LTE) network and a code division multiple access (CDMA) network, wherein the handover is indicated in a context transfer, and wherein the IP address is marked as being originated at the home agent element.

2. The method of claim 1, further comprising:
maintaining communications with a packet data serving node (PDSN) and an Authentication, Authorization, and Accounting (AAA) element in order to facilitate billing for the subscriber.

3. The method of claim 1, wherein the inter-process communication is used to maintain the session for the subscriber when the subscriber is attached to different networks.

4. The method of claim 1, wherein authentication and security parameters are negotiated before determining whether the context exists for the flow.

5. The method of claim 1, wherein if a handover occurs for the flow, an accounting interim message update is sent that includes an accounting session identification.

6. The method of claim 1, wherein assigning the IP address for the subscriber includes evaluating whether a local IP address pool has an available IP address, and wherein another gateway is contacted if the local IP address pool does not have an available IP address.

7. The method of claim 1, further comprising:
assigning new routing information associated with the IP address that was assigned for the subscriber such that data traffic is sent to the subscriber.

8. Computer program product stored in one or more non-transitory media, that includes code executed by a processor to perform operations comprising:
receiving a packet for a flow associated with a subscriber;
determining if a context exists for the flow by using a handover query to a packet gateway, wherein authentication and security parameters are negotiated before determining whether the context exist for the flow;

assigning an Internet protocol (IP) address for the subscriber, by the packet gateway, in response to the home agent element not having the context for the flow; and creating, by the packet gateway, a session for the subscriber, wherein the session is created using inter-process communication between the home agent element and the packet gateway, and wherein the session is maintained for a handover involving the subscriber roaming between a Long Term Evolution (LTE) network and a code division multiple access (CDMA) network, wherein the handover is indicated in a context transfer, and wherein the IP address is marked as being originated at the home agent element.

9. The computer program product of claim 8, further comprising:

maintaining communications with a packet data serving node (PDSN) and an Authentication, Authorization, and Accounting (AAA) element in order to facilitate billing for the subscriber.

10. The computer program product of claim 8, wherein the inter-process communication is used to maintain the session for the subscriber when the subscriber is attached to different networks.

11. The computer program product of claim 8, wherein authentication and security parameters are negotiated before determining whether the context exists for the flow.

12. The computer program product of claim 8, wherein if a handover occurs for the flow, an accounting interim message update is sent that includes an accounting session identification.

13. The computer program product of claim 8, the operations further comprising:

assigning new routing information associated with the IP address that was assigned for the subscriber such that data traffic is sent to the subscriber.

14. An apparatus, comprising:
a memory configured to store data,
a hardware processor operable to execute instructions associated with the data, and
a home agent module configured to interface with the hardware processor in order to:
receive a packet for a flow associated with a subscriber;
determine if a context exists for the flow by using a handover query to a packet gateway, wherein authentication and security parameters are negotiated before determining whether the context exist for the flow;
the packet gateway configured to:
assign an Internet protocol (IP) address for the subscriber in response to the context not being present in the home agent module for the flow; and
create a session for the subscriber, wherein the session is created using inter-process communication between the home agent module and the packet gateway;
and wherein the session is maintained for a handover involving the subscriber roaming between a Long Term Evolution (LTE) network and a code division multiple access (CDMA) network, wherein the handover is indicated in a context transfer, and wherein the IP address is marked as being originated at the home agent module.

15. The apparatus of claim 14, wherein the home agent module is further configured to:

maintain communications with a packet data serving node (PDSN) and an Authentication, Authorization, and Accounting (AAA) element in order to facilitate billing for the subscriber.

16. The apparatus of claim 14, wherein the inter-process communication is used to maintain the session for the subscriber when the subscriber is attached to different networks.

17. The apparatus of claim 14, wherein authentication and security parameters are negotiated before determining whether the context exists for the flow.

18. The apparatus of claim 14, wherein an evaluation is made as to whether a local IP address pool has an available IP address, and wherein another gateway is contacted if the local IP address pool does not have an available IP address.

19. The apparatus of claim 14, wherein new routing information associated with the IP address is assigned such that data traffic is sent to the subscriber.

20. The apparatus of claim 14, wherein if a handover occurs for the flow, an accounting interim message update is sent that includes an accounting session identification.

* * * * *